United States Patent
Nishida et al.

(10) Patent No.: US 7,188,524 B2
(45) Date of Patent: Mar. 13, 2007

(54) CONDUCTIVE ELEMENT FOR A MOVABLE ELECTRIC CIRCUIT AND A VIBRATION GYROSCOPE

(75) Inventors: Hiroshi Nishida, Amagasaki (JP); Kazuo Hozaki, Amagasaki (JP); Kenji Komaki, Amagasaki (JP)

(73) Assignee: Sumitomo Precision Products, Co., Ltd, Hyogo (JP)

( * ) Notice: Subject to any disclaimer, the term of this patent is extended or adjusted under 35 U.S.C. 154(b) by 0 days.

(21) Appl. No.: 10/902,592

(22) Filed: Jul. 29, 2004

(65) Prior Publication Data

US 2005/0000285 A1   Jan. 6, 2005

Related U.S. Application Data

(63) Continuation of application No. PCT/JP03/08065, filed on Jun. 25, 2003.

(30) Foreign Application Priority Data

Jun. 28, 2002   (JP)   ............... 2002-189677

(51) Int. Cl.
  *G01P 9/04*   (2006.01)
  *G01C 19/56*   (2006.01)
  *C22C 21/00*   (2006.01)
(52) U.S. Cl. ................. 73/504.13; 420/528; 73/504.12
(58) Field of Classification Search ............ 73/504.12, 73/504.13; 174/126.4, 254; 420/528
  See application file for complete search history.

(56) References Cited

U.S. PATENT DOCUMENTS 5,534,463 A * 7/1996 Lee et al. ................... 438/643
5,942,054 A * 8/1999 Tregilgas et al. ........... 420/552
6,055,858 A * 5/2000 Muenzel et al. ......... 73/504.12
6,555,204 B1 * 4/2003 Naeem et al. ............... 428/192
6,592,812 B1 * 7/2003 Kubota et al. .............. 420/542

FOREIGN PATENT DOCUMENTS

EP   0859219 A3   8/1998

(Continued)

OTHER PUBLICATIONS

Patent Abstracts of Japan for JP10-267667 published on Oct. 9, 1998.
Patent Abstracts of Japan for JP05-098377 published on Apr. 20, 1993.
Patent Abstracts of Japan for JP2000-212664 published on Aug. 2, 2000.
Patent Abstracts of Japan for JP11-118490 published on Apr. 30, 1999.

*Primary Examiner*—John E. Chapman
(74) *Attorney, Agent, or Firm*—Darby & Darby (57) ABSTRACT

A conductive element for a movable electrical circuit (a conductive element most suitable for an electric circuit that is placed on a movable element in which the shape of the circuit itself changes during circuit operation) which is Al-based and has an average cross sectional area for the crystal grain of 1 micron$^2$ or less. Preferably, this conductive element contains N+O at 550 to 20000 ppm in atomic concentration and also one or more selected from the group consisting of Si at 0.5–5.0% in atomic concentration, Ta at 0.5–5.0%, and Cu at 0.5–5.0%. More preferably, it contains Nd at 0.5–5.0%.

This conductive element for a movable circuit is especially suitable for the wiring pattern in a vibrating gyroscope.

15 Claims, 5 Drawing Sheets

FOREIGN PATENT DOCUMENTS

| | | |
|---|---|---|
| GB | 1 475 330 | 6/1977 |
| GB | 1 510 940 | 5/1978 |
| JP | 04-128336 A1 | 4/1992 |
| JP | 05-098377 | 4/1993 |
| JP | 10-267667 | 10/1998 |
| JP | 11-118490 | 4/1999 |
| JP | 2000-212664 | 8/2000 |

* cited by examiner

CONDUCTIVE ELEMENT FOR A MOVABLE ELECTRIC CIRCUIT AND A VIBRATION GYROSCOPE

CROSS-REFERENCE TO RELATED APPLICATION

This application is a Continuation of International Patent Application Serial No. PCT/JP2003/008065 filed Jun. 25, 2003, which was published in Japanese on Jan. 8, 2004 as WO 2004/003936 A1, and claims priority under 35 U.S.C. §119 to Japanese Patent Application No. 2002-189677 filed on Jun. 28, 2002, which is incorporated herein by reference in its entirety.

FIELD OF THE INVENTION

The present invention relates to a conductive element used in an electric circuit placed on a movable element in which the shape of the circuit changes during movement (henceforth referred to as a movable circuit). The present invention also relates to a vibrating gyroscope that uses this conductive element in a wiring pattern.

BACKGROUND OF THE INVENTION

Silicon is the most common substrate material in semiconductor devices, particularly semiconductor integrated circuits (IC), microelectronics devices, and in accurate measurement devices. Silicon substrates are used widely because silicon wafers of high purity can be industrially manufactured inexpensively. In addition, a highly chemically stable oxide film ($SiO_2$) is formed on the silicon substrate, and this results in a simple insulated separation of elements in high integration devices.

For example, in manufacturing ICs by the batch system, several devices are formed on top of a single silicon wafer in an electrically insulated and isolated state. The insulated separation required for this device is achieved by forming an oxide film of approximately 0.3–1.0 micron on top of the wafer.

An example of a precision device includes a ring-shaped vibrating gyroscope (for example, Japanese Patent Publication Number 10-267667). The ring-shaped vibrating gyroscope is a type of vibrating gyroscope in which a suspended ring-shaped vibratory resonator is provided with an elliptical vibration. Unlike a piezoelectric gyroscope which is also a vibrating gyro, the ring-shaped vibrating gyroscope does not have a fixed support point sensitive to external stress. Because the elliptical vibration is affected less by the external stress, highly accurate angular velocity measurements can be achieved.

Figure 1:
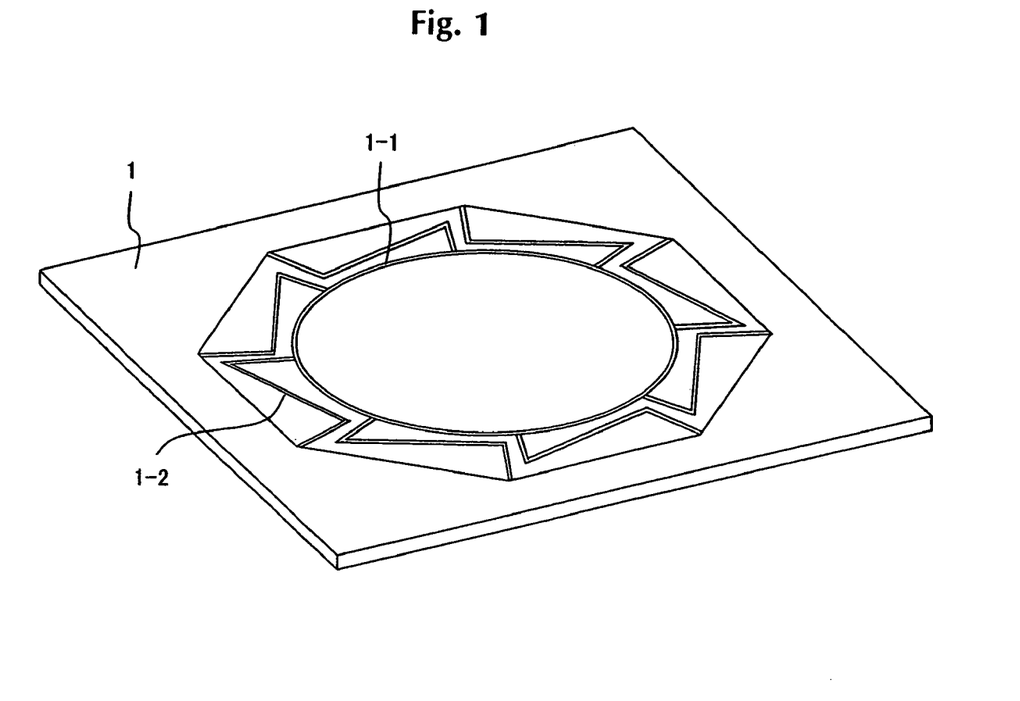
FIG. 1 shows a silicon substrate for a ring-shaped vibrating gyroscope.
Figure 2:
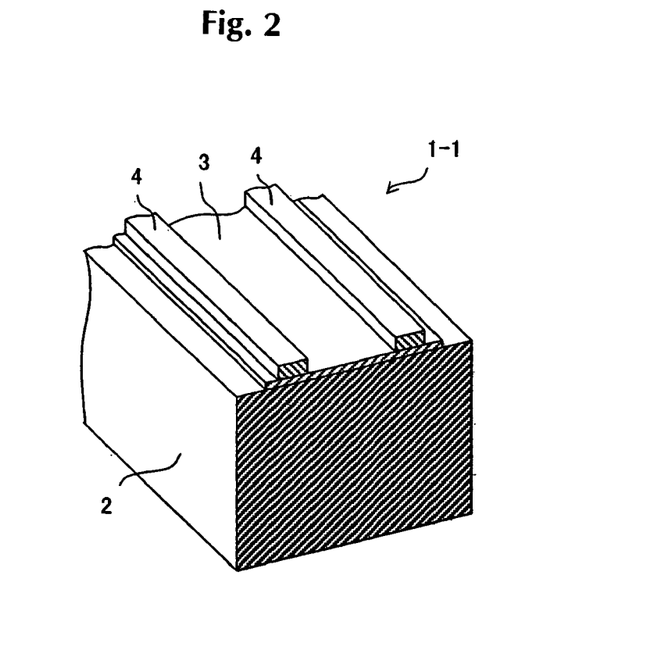
FIG. 2 shows a wiring pattern provided on the ring.

FIG. 1 shows a silicon substrate for a ring-shaped vibrating gyroscope. FIG. 2 shows a wiring pattern provided on top of the ring.

Referring to FIG. 1, a silicon substrate 1 has a construction in which a ring 1-1 positioned in the center is suspended by eight suspensions 1-2. Referring to FIG. 2, silicon substrate 1 (ring 1-1 in the example in FIG. 2) is a monocrystal silicon wafer 2, which is thinner than those normally used in integrated circuits such as CPUs and the like, and has an insulating film 3. The ring-shaped resonator is created by the following steps: after an Al—Si conductive film for wiring is formed on top of insulating film 3 by sputtering, a track 4 (wiring pattern) is formed by photolithography and chemical etching, and in addition, ring 1-1 and suspensions 1-2 are formed by ICP (inductively coupled plasma) etching.

There is a circumferential flow of alternating current in track 4 on ring 1-1 and suspensions 1-2. A magnetic field is applied to track 4 in the vertical direction by a magnetic circuit (not shown). As a result, track 4 deforms into an elliptical shape by Lorentz force (this is vibration mode 1). By adjusting the phase of the current flowing through suspension 1-2, angular velocity is given to the elliptical vibration of ring 1-1. When this occurs, Coriolis force acts against vibration mode 1, and a vibration mode 2 positioned at a displacement of 45 degrees from vibration mode 1 is generated. By monitoring the node of vibration mode 1 generated by vibration mode 2, the angular velocity is obtained.

Bias drift is used as an index for measuring the performance of a gyroscope. Bias drift is the change in the signal from the gyroscope indicating that the ring is rotating even though in reality the ring is stationary. A smaller bias drift indicates better performance of the gyroscope. The unit for bias drift is the apparent angular velocity detected per unit time (usually around 1 hour) [(deg/sec)/hr]. Reasonable values for bias drift vary depending on the purpose, but for example, in gyroscopes used for oscillation control, this is [0.05 (deg/sec)/hr] or lower.

Bias drift is a very important index for ensuring an acceptable performance for the purposes of the gyroscope. Even gyroscopes made using the same materials can have a range in values for bias drift. By studying the reason for this, the present inventors discovered that samples with large bias drifts had comparatively larger grain size in the conductive film used for wiring.

Figure 3A:
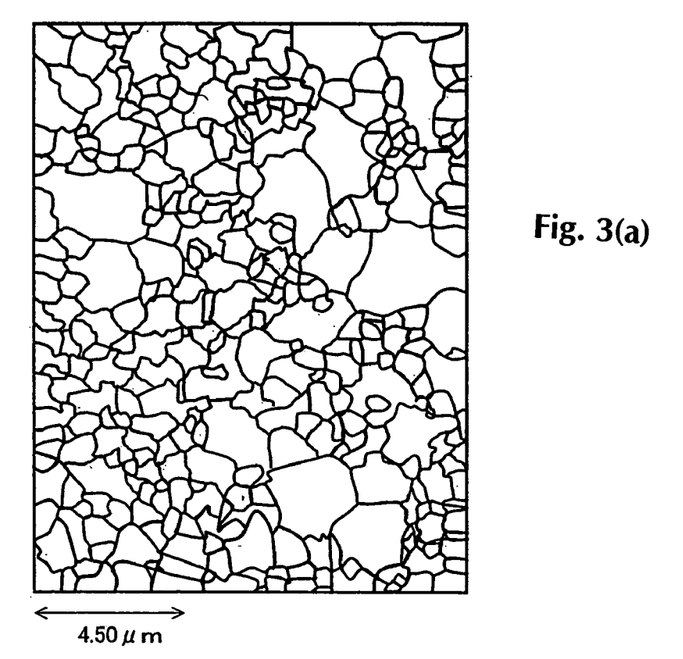
FIG. 3(a) is a structural diagram of the conductive film for wiring in a sample having a small bias drift.
Figure 3B:
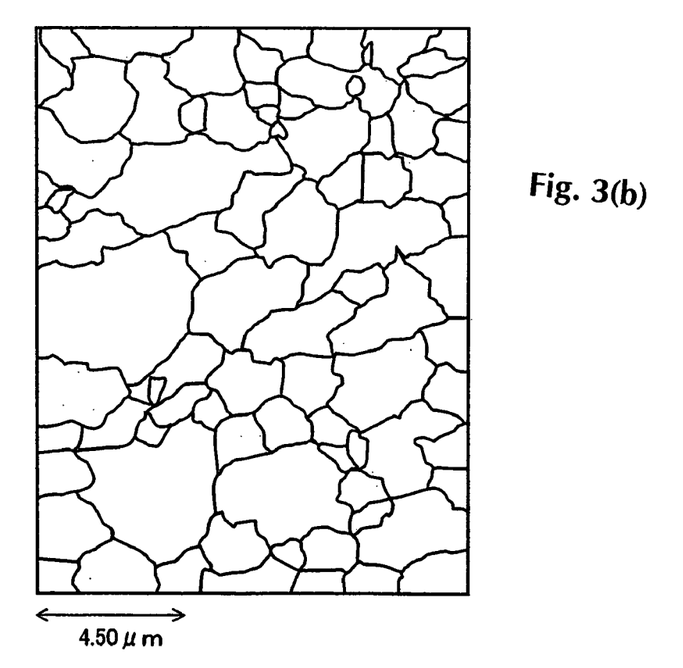
FIG. 3(b) is a structural diagram of the conductive film for wiring in a sample with a large bias drift.

Referring to FIG. 3, the metal structure of a conductive film used for wiring of the vibrating gyroscope is shown. FIG. 3(a) is a structural diagram of a conductive film for wiring in a sample with a small bias drift of 0.03 (deg/sec)/hr. FIG. 3(b) is a structural diagram of a conductive film for wiring of a sample with a large bias drift of 0.12 (deg/sec)/hr. These figures are traces of EBSP images of sections of the conductive films for wiring. Referring to FIG. 3, the crystal grains of the sample with a small bias drift was smaller compared to samples with a large bias drift.

In general, conductivity of the wiring used in semiconductor devices is better when the grain size is large. The main reason for this is that when the grain size of the wiring is small, the grain boundary is increased, and this acts to resist and interfere with the movement of free electrons.

SUMMARY OF THE INVENTION

It was reasoned that for a large-grain-size conductive film used for wiring on a movable element, the mechanical strength would change easily, for example, by work hardening when an external force is applied to the wiring. Based on this hypothesis, more research was conducted. As a result, with regard to a conductive element used in a movable circuit such as a vibrating gyro, it was found to be important to reduce the changes in mechanical strength by reducing the grain size of the conductive film used for wiring.

The object of the present invention is to provide an optimal conductive element for an electric circuit placed on a movable element in which the shape of the electric circuit itself changes during circuit operation. A further object of the present invention is to provide a vibrating gyroscope using this conductive element as a wiring pattern.

The present invention was completed as a result of repeated research into reducing the grain size of the wiring pattern in movable electric circuits, particularly vibrating gyroscopes.

An implementation of the present invention is a conductive element for a movable circuit, which includes an Al-based conductive element with an average cross-sectional area for the crystal grain of 1 micron$^2$ or less. This conductive element preferably contains N+O at an atomic concentration of 550–20000 ppm. In addition, it is also preferable that this conductive element contains one or more selected from the group consisting of Si at 0.5–5.0%, Ta at 0.5–5.0%, and Cu at 0.5–5.0% in atomic concentrations. More preferably, this conductive element contains Nd at 0.5–5.0% in atomic concentration.

In another implementation of the present invention, the conductive element for a movable circuit described above is used for a wiring pattern of a vibrating gyroscope.

BRIEF DESCRIPTION OF THE FIGURES

FIG. 3 shows a metal structure of a conductive film for wiring of a vibrating gyroscope.

FIG. 5(a) shows a conductive element containing 1.0% Si and 499 ppm N+O. FIG. 5(b) shows a conductive element containing 1.0% Si and 4817 ppm N+O. FIG. 5(c) shows a conductive element containing 2.0% Nd.

FIG. 6(a) shows a conductive element containing 1.0% Si and 499 ppm N+O. FIG. 6(b) shows a conductive element containing 1.0% Si and 4817 ppm N+O. FIG. 6(c) shows a conductive element containing 2.0% Nd.

DETAILED DESCRIPTION OF THE INVENTION

The present invention is an Al-based conductive element for a movable electric circuit. This conductive element for a movable electric circuit can be effectively used as a wiring pattern of a vibrating gyro, for example. The Al-based conductive element for a movable circuit represent in an electric circuit placed on a movable element in which the shape of the electric circuit changes during movement.

(A) Average Cross-Sectional Area of Crystal Grains

When the average cross sectional area of the crystal grains exceeds 1 micron$^2$, the relative resistance is small and conductivity is good because the grain size is large, however the mechanical strength can easily change. The degree of change in strength is represented by the following Hall-Petch relation formula (a).

$$\sigma = \sigma_0 + A \cdot d^{-1/2} \quad (a)$$

$\sigma_0$ is the yield stress for a monocrystal metal, A is a proportional coefficient, d is the diameter of the crystal grain.

Figure 4:
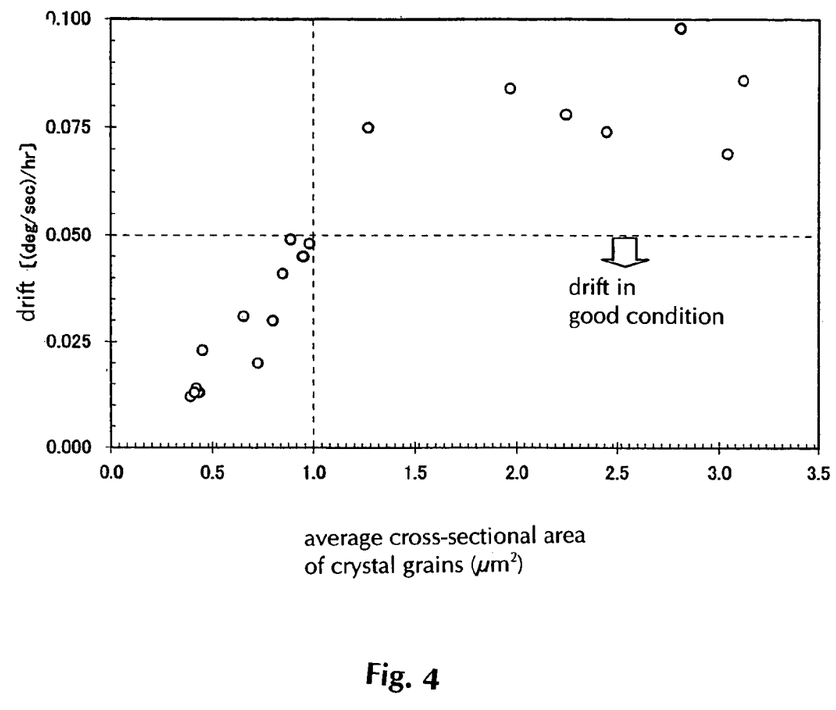
FIG. 4 shows the relationship between the average cross-sectional area of crystal grains and bias drift.

Referring to FIG. 4, this shows the relationship between the average grain cross-sectional area and bias drift when the average grain cross-sectional area is 1 micron$^2$ or less, bias drift can be controlled to 0.05 (deg/sec)/hr or less. Therefore, the average grain cross-sectional area was limited to 1 micron$^2$ or less. From the standpoint of bias drift, smaller grain cross-sectional areas are preferred, especially 0.5 micron$^2$ or less. No lower limit need be set for the average grain cross-sectional area, but when the average cross-sectional area is less than 0.00008 micron$^2$, resistivity becomes too large and conductivity becomes poor. Therefore, it is preferable to have an average grain cross sectional area of 0.00008 micron or greater.

The average grain cross-sectional area can be obtained by the following steps:

(1) Obtain the EBSP (electron back-scattering pattern) of the sample.

(2) Select a square field with each side having a length of α micron, and count the number $n_1$ of grains contained entirely within this field and the grain number $n_2$ intersecting with the square.

(3) Calculate the total number $n_T (=n_1+n_2/2)$ of grains within a field.

(4) Execute this action a total of i times (i is 10 or greater) with different fields.

(5) Obtain the average cross-sectional area of the grains in each field $S_i$ $(=a^2/n_T)$, and determine the average cross-sectional area $S_{AVG}[=(\Sigma S_i)/i]$ for all of the fields.

(B) The Chemical Composition

As described above in (A), crystal grains with an average cross-sectional area of 1 micron$^2$ or less is advantageous in conductive elements used in movable circuits. One way of having a grain size within the above range is to increase the amount of nitrogen and oxygen which are normally contained as impurities in conductive elements. In other words, a grain size within the above range is achieved by having the Al-based conductive element contain N+O at 550–20000 ppm in atomic concentration (henceforth, % refers to atomic %, and ppm refers to atomic ppm).

In general, N and O are elements contained as impurities within the conductive element. When these elements are present in the conductive element in large quantities, the grain size is reduced, the grain boundaries are increased, and the electric resistance is increased. As a result, with conductive elements used in normal electric circuits, it was deemed preferable to have reduced amounts of these elements. Therefore, in wiring for standard semiconductors in which there is no change in shape of the circuit itself during circuit operation, the amount of N or O is each generally set to 10 ppm or less.

However, as described previously, the target of the present invention is an electric circuit placed on a moving body in which the shape of the circuit itself changes during circuit operation. With this type of electric circuit, while ensuring good conductivity is important, it is also important to increase the stability of the mechanical strength of the electric circuit itself.

When the amount of N+O contained in the Al-based conductive element is less than 550 ppm, the formation of Al nitrides and Al oxides is inadequate, and crystal grains are not sufficiently small.

Therefore, even though the conductivity is good, the mechanical strength of the conductive element itself can change during circuit operation. However, when N+O exceeds 20000 ppm, Al nitrides are generated, which contribute to increased resistivity., This is disadvantageous in terms of efficiency because an increased concentration of $N_2$ and $O_2$ is mixed with Ar for injection into the vacuum film deposition chamber.

Therefore, in all cases, smooth movability of the conductive element itself is easily compromised. For example, when this conductive film is used for a wiring pattern in a vibrating gyro, bias drift becomes large. Such a vibrating gyroscope cannot be used for purposes requiring a high degree of accuracy. Therefore, the conductive element for a movable circuit of the present invention preferably contains N+O at an atomic concentration of 550–20000 ppm. More preferably, it contains N+O at 600–18000 ppm.

The conductive element for a movable circuit of the present invention is based on Al and contains 500–20000 ppm of N+O and can also contain one or more selected from the group consisting of Si at 0.5–5.0%, Ta at 0.5–5.0%, and Cu at 0.5–5.0%.

In other words, Si, Ta, and Cu are all useful elements for strengthening solid solutions. This effect becomes apparent when any of these elements becomes 0.5% or greater. When there is more than 5.0% of any of these elements, there is an increase in deposits, and there may be unevenness in mechanical strength. Therefore, if one or more of these elements are to be included, the amount for each would be preferably 0.5–5.0%.

More preferably, the Al-based conductive element for a movable electric circuit of the present invention contains 0.5–5.0% of Nd. Nd by itself is an element that causes the grain size of Al to be smaller. If there is a suitable amount of Nd in the conductive element, an average grain cross-sectional area of 1 $micron^2$ or less can be achieved regardless of the amount of nitrogen or oxygen. In addition, a conductive element with a suitable amount of Nd has another advantage of having a smaller grain measurement in the thickness direction. This will be explained further with reference to the Figures.

Figure 5A:
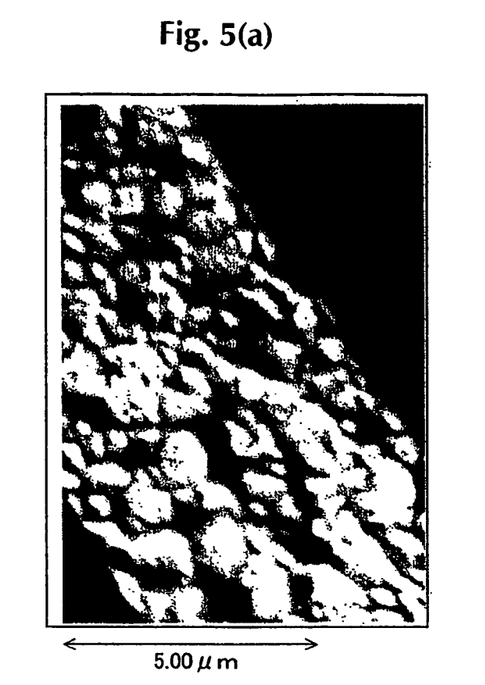
FIGS. 5(a)–5(c) are electron back-scattering pattern (EBSP) images of the Al-based conductive element as photographed from the top surface.
Figure 5B:
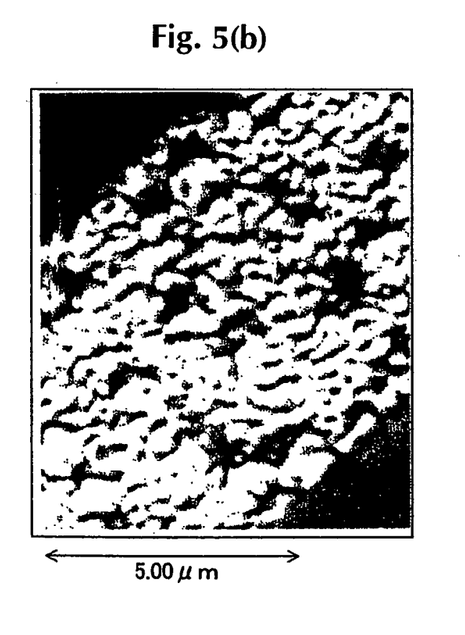
Figure 5C:
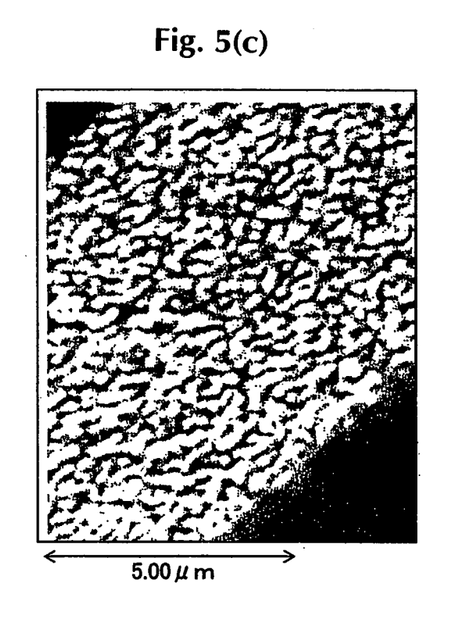
Figure 6A:
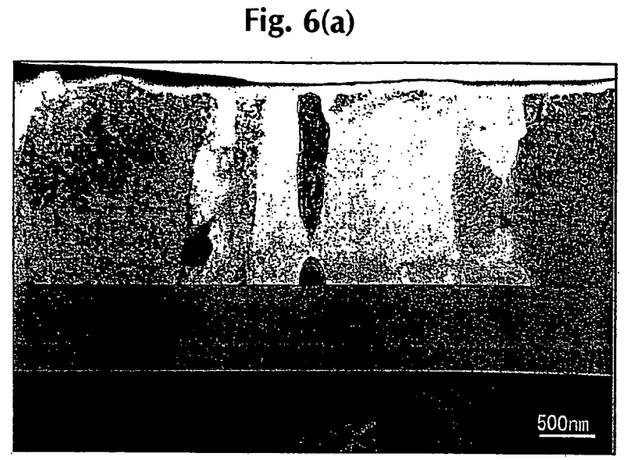
FIGS. 6(a)–6(c) are structural photographs using transmission electron microscopy (TEM) to photograph a cross-section of the conductive element in the thickness direction.
Figure 6B:
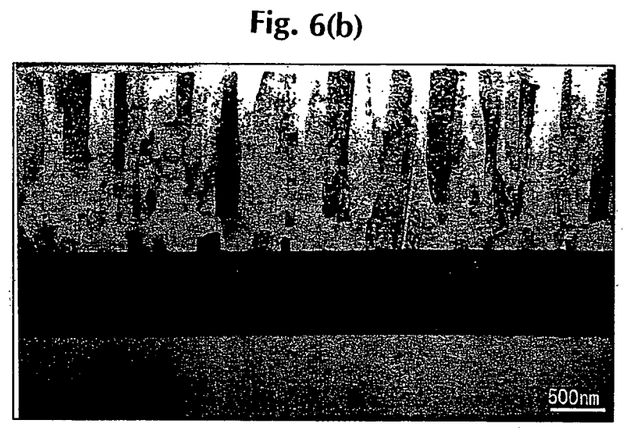
Figure 6C:
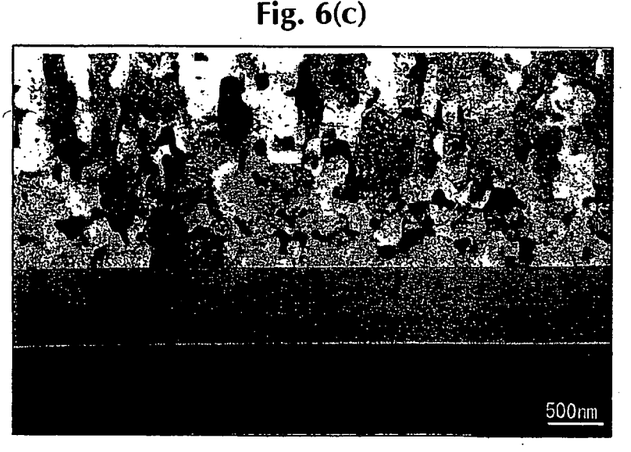

FIG. 5 shows an electron back-scattering pattern (EBSP) image of the Al-based conductive element as photographed from a top surface. FIG. 6 is a structural photograph using a transmission electron microscope (TEM) of a cross-section in the thickness direction of the conductive element. FIGS. 5(a) and 6(a) show a conductive element containing Si at 1.0% and N+O at 499 ppm, FIGS. 5(b) and 6(b) show a conductive element containing Si at 1.0% and N+O at 4817 ppm, and FIGS. 5(c) and 6(c) show a conductive element containing Nd at 2.0%.

As shown by FIGS. 5(a) and 6(a), with the conductive element containing N+O at 499 ppm, large crystal grains are formed both on the upper surface and in the cross-section in the thickness direction. In addition, as shown in FIG. 5(b), with the conductive element having N+O at 4817 ppm, small crystal grains are formed on the upper surface. However, as shown in FIG. 6(b), the shape of these crystal grains is columnar. On the other hand, as shown in FIGS. 5(c) and 6(c), conductive elements containing 2.0% Nd form crystal grains that are small both on the upper surface and in the cross section in the thickness direction. As shown in embodiments described later, when an Al-based conductive element containing Nd is used for the wiring pattern of a vibrating gyroscope, it is possible to further reduce bias drift.

As described above, the conductive element for a movable electric circuit is preferably Al-based and contains Nd. The amount of Nd is preferably 0.5–5.0%.

In other words, when the amount of Nd is less than 0.5%, the Al crystal grains are not adequately small. When the amount exceeds 5.0%, there is an excess of deposits, resulting in unevenness in mechanical strength. Therefore, when Nd is included, the amount is preferably 0.5–5.0%.

As described above, by having Nd, the grain size of the conductive element is small regardless of the amount of nitrogen or oxygen included. However, the effect described above is not lost even when N+O is within the range of 550–20000 ppm. In addition, in the conductive element according to an implementation of the present invention, one or more selected from the group consisting of Si, Ta, and Cu at 0.5–5.0% can also be included together with Nd.

Each of the elements contained within the conductive element can be measured using SIMS (secondary ion mass spectrometry), for example. In SIMS, a primary ion (oxygen ion or cesium ion) is beamed at a sample. By mass spectrometry of the emitted secondary ions, the elements are determined, and by using standard samples with known concentrations, they can be quantified.

(C) Manufacturing Method of the Conductive Element for a Movable Circuit According to an Implementation of the Present Invention.

In general, conductive elements for circuits are made using a sputtering deposition equipment or the like to deposit a coating of a conductive element onto a substrate surface. The conductive element for a movable circuit of the present invention is preferably created using a DC magnetron sputtering deposition equipment.

In DC magnetron sputtering, Ar gas or the like is sealed inside a vacuum film deposition chamber that has a cathode and an anode. By applying a direct current voltage of 400–500 V onto both electrodes, gas molecules of Ar and the like are cationized and are collided at high speeds with the target (Al alloy). Al particles (or additionally Si particles, Ta particles, Cu particles, or Nd particles) are scattered. By having these particles attach to the silicon substrate (in reality, to the $SiO_2$ film), an Al alloy film is deposited in vacuum onto the silicon substrate.

In a vacuum deposition, N and/or O are included in the conductive element for a movable circuit according to the implementation of the present invention, by sputtering with a gas of Ar mixed with $N_2$ and/or $O_2$. By doing so, N ions and/or O ions present in the vacuum film deposition chamber is incorporated into the conductive film. The higher the concentration of $N_2$ and $O_2$ mixed with Ar, the higher the concentration of N and O incorporated into the conductive film. In order to have the amount of these elements in the conductive film fall within the desired range, the N and O concentration in the mixture gas should be around 600–20000 ppm, for example.

Because it may increase grain size, heat treatment may be dispensed with. However, for example, in the manufacturing process of a vibrating gyroscope, it may be necessary to have a silicon substrate with the wiring pattern created by the above method joined with a glass pedestal. Normally, an anodic bonding joining technique is used. In anodic bonding, the silicon substrate and glass pedestal are heated to approximately 420 degrees C., and a 600V DC voltage is applied for approximately 30 minutes. As a result, the conductive element receives a type of heat treatment, but even after this heat is applied, the desired grain size is achieved.

When a conductive element made in this manner is used for the wiring pattern in a vibrating gyroscope, the bias drift for the vibrating gyroscope is reduced as shown by embodiments described later. A vibrating gyroscope according to an implementation of the present invention is manufactured, for example, as follows.

The vibrating gyroscope of the present invention can be created in the following manner. After forming an $SiO_2$ film with a thickness of approximately 7500 angstroms on the surface of a silicon wafer, a conductive film of an Al—Si alloy or the like is formed. Next, using photolithography and chemical etching, the desired wiring pattern is formed. By further etching the silicon wafer by ICP etching, a vibrating gyroscope is completed.

(Embodiments)

After forming a $SiO_2$ film with a thickness of approximately 7500 angstroms on the surface of a silicon wafer, an Al alloy conductive film having the chemical composition shown in Table 1 was formed on the $SiO_2$ film by DC magnetron sputtering.

With regard to the Embodiments 1–8 and Comparative examples 4–6 and 8, the N and O concentrations in the conductive film were adjusted by changing the $N_2$ and $O_2$ concentrations in the mixture gas injected into the vacuum film deposition chamber. With regard to Embodiments 9–11 and Comparative examples 1–3, 7 and 9, film deposition was conducted by injecting the usual Ar gas. The specified wiring patterns were formed by using photolithography and chemical etching on the silicon substrates on which conductive elements with various chemical compositions were formed. With further etching of the silicon wafer by ICP etching, a ring-shaped resonator was made. These were joined and die bonded under identical conditions, and the vibrating gyroscopes were completed. Twenty five vibrating gyroscopes of each were created.

For these vibrating gyroscopes, the N and O concentrations, grain size, and bias drift were measured.

The measurement of the concentrations of N and O was conducted using SIMS as described previously. For bias drift, the vibrating gyroscope was placed in a constant temperature bath of 50 degrees C. Measurements of the angular velocity output when the gyroscope was at rest were taken at an initial value and a value four hours after the initial value. The bias drift was obtained by dividing the difference in these values by 4. In addition, grain size as the average cross-sectional area of crystal grain was determined as follows:

(1) The EBSP image of each wiring pattern was obtained.
(2) A square field with each side having a length of 4.5 microns was selected at random, and the grain number $n_1$ contained entirely within this field and the grain number $n_2$ intersecting with the square were counted.
(3) The total number $n_T(=n_1+n_2/2)$ of grains within a field was calculated.
(4) This action was conducted a total of 10 times with different fields.
(5) The average cross-sectional area of the grains in each field $S_i(=a^2/n_T)$ was obtained, and in addition, the average cross-sectional area $S_{AVG}[=(\Sigma S_i)/i]$ for all of the fields was determined.

These results are shown in Table 1.

TABLE 1

| Division | | Si (%) | Ta (%) | Cu (%) | Nd (%) | N (ppm) | O (ppm) | N + O (ppm) | Average Cross-section Savg(range of meas ($\mu m^2$) | Drift Value* (deg/sec)/h |
|---|---|---|---|---|---|---|---|---|---|---|
| Embodiments | 1 | 5.0 | — | — | — | 449 | 132 | 581 | 0.80 (0.56~1.35) | 0.030 |
| | 2 | 5.0 | — | — | — | 199 | 432 | 631 | 0.72 (0.52~1.23) | 0.020 |
| | 3 | 5.0 | — | — | — | 1679 | — | 1679 | 0.43 (0.35~0.56) | 0.013 |
| | 4 | 5.0 | — | — | — | 9765 | 8971 | 18736 | 0.92 (0.80~1.31) | 0.047 |
| | 5 | 2.5 | — | — | — | 817 | 1015 | 1832 | 0.39 (0.33~0.54) | 0.012 |
| | 6 | — | 2.5 | — | — | — | 1734 | 1734 | 0.42 (0.34~0.57) | 0.014 |
| | 7 | — | — | 2.5 | — | 845 | 1002 | 1847 | 0.45 (0.40~0.68) | 0.023 |
| | 8 | 2.5 | 2.5 | 2.5 | — | 1032 | 958 | 1990 | 0.65 (0.56~0.78) | 0.031 |
| | 9 | — | — | — | — | 987 | 1025 | 2012 | 0.85 (0.75~1.21) | 0.041 |
| | 10 | — | — | — | 0.6 | — | — | — | 0.95 (0.75~1.10) | 0.045 |
| | 11 | — | — | — | 1.5 | — | — | — | 0.41 (0.32~0.68) | 0.013 |
| | 12 | — | — | — | 4.7 | — | — | — | 0.98 (0.65~1.28) | 0.048 |
| Comp. Ex. | 1 | 5.0 | — | — | — | — | — | — | 2.81 (1.76~5.05) | 0.098 |
| | 2 | — | 2.5 | — | — | — | — | — | 2.25 (1.25~6.15) | 0.078 |
| | 3 | — | — | 2.5 | — | — | — | — | 3.12 (1.98~7.05) | 0.086 |
| | 4 | 5.5 | — | — | — | 875 | 1026 | 1901 | 1.97 (0.85~4.50) | 0.084 |
| | 5 | — | 5.5 | — | — | 1024 | 975 | 1999 | 2.45 (1.35~4.35) | 0.074 |
| | 6 | — | — | 5.5 | — | 898 | 893 | 1791 | 3.04 (1.75~5.96) | 0.069 |
| | 7 | — | — | — | — | — | — | — | 17.0 (15.7~24.3) | 0.124 |
| | 8 | — | — | — | — | 1987 | 1785 | 3772 | 0.89 (0.78~1.25) | 0.049 |
| | 9 | — | — | — | 5.5 | — | — | — | 1.27 (0.98~1.35) | 0.075 |

* Drift value is the bias drift at 50 degrees C.
"—"indicate that for Si, Ta, Cu, and Nd, these were not added, for N and O, this means that they were not injected into Ar gas.

As shown in Table 1, all of Embodiments 1–12 had an average grain cross-sectional area of 1 micron$^2$ or less and a bias drift of 0.012–0.048 (deg/sec)/hr. In particular, with Embodiments 3, 5–7 and 11, which had average cross-sectional areas of 0.5 micron$^2$ or less, the drift was further improved at 0.03 (deg/sec)/hr or less.

On the other hand, all of Comparative examples 1–9 had average grain cross-sectional areas that exceeded 1 micron$^2$. The drift was high at 0.069–0.124 (deg/sec)/hr.

The conductive element for a movable circuit of the present invention allows for more freedom for the electric circuit itself to change position. As a result, this is a conductive element best suited for circuits placed on movable elements in which the shape of the circuit itself changes during circuit operation. In particular, by using this conductive element in a wiring pattern for a vibrating gyroscope, the bias drift is minimized, and a high performing vibrating gyroscope can be obtained.

Although the foregoing invention has been described with respect to certain exemplary embodiments, these embodiments are to be considered only as illustrative and not restrictive. The scope of the invention, therefore, is indicated by the appended claims and their combination in whole or in part rather than by the foregoing description.

What is claimed is:

1. A conductive film for a movable electric circuit, comprising:
    an Al-based conductive film provided in the movable electric circuit that changes shape, wherein an average cross-sectional area of the crystal grain of said Al-based conductive film is 1 micron$^2$ or less,
    wherein said Al-based conductive film contains an amount of atomic nitrogen and atomic oxygen of 550–4000 ppm in atomic concentration.

2. A conductive element for a movable electric circuit as set forth in claim 1, wherein said Al-based conductive element contains one or more selected from the group consisting of Si at 0.5–5.0% in atomic concentration, Ta at 0.5–5.0%, and Cu at 0.5–5.0%.

3. A conductive element for a movable electric circuit as described in claim 2, wherein said Al-based conductive element contains Nd at 0.5–5.0% in atomic concentration.

4. A conductive element for a movable electric circuit as set forth in claim 1, wherein said Al-based conductive element contains Nd at 0.5–5.0% in atomic concentration.

5. A vibrating gyroscope, wherein the conductive film for a movable circuit described in claim 1 is used for a wiring pattern of the vibrating gyroscope.

6. The vibrating gyroscope of claim 5, wherein the wiring pattern comprises a ring-shaped resonator, and wherein the gyroscope has a bias drift of less than 0.048 (deg/sec)/hr at 50 deg C.

7. A vibrating gyroscope, wherein the conductive element for a movable circuit described in claim 2 is used for a wiring pattern of the vibrating gyroscope.

8. A vibrating gyroscope, wherein
    the conductive element for a movable circuit described in claim 4 is used for a wiring pattern of the vibrating gyroscope.

9. A conductive element for a movable electric circuit, comprising:
    an Al-based conductive element with an average cross-sectional area of the crystal grain being 1 micron$^2$ or less, wherein said Al-based conductive film contains an amount of atomic nitrogen and atomic oxygen of 550–20000 ppm in atomic concentration, and contains one or more selected from the group consisting of Si at 0.5–5.0% in atomic concentration, Ta at 0.5–5.0%, and Cu at 0.5–5.0%.

10. A conductive element for a movable electric circuit, comprising:
    an Al-based conductive element with an average cross-sectional area of the crystal grain being 1 micron$^2$ or less;
    wherein said Al-based conductive element contains an amount of atomic nitrogen and atomic oxygen of 550–20000 ppm in atomic concentration and Nd at 0.5–5.0% in atomic concentration.

11. A movable electric circuit, comprising:
    a circuit that changes shape; and
    an Al-based conductive film provided as a wiring pattern for the circuit,
    wherein an average cross-sectional area of the crystal grain of said Al-based conductive film is 1 micron$^2$ or less, and
    wherein said Al-based conductive film contains an amount of atomic nitrogen and atomic oxygen of 550–4000 ppm in atomic concentration.

12. A movable electric circuit as described in claim 11, wherein
    said Al-based conductive element contains one or more selected from the group consisting of Si at 0.5–5.0% in atomic concentration, Ta at 0.5–5.0%, and Cu at 0.5–5.0%.

13. A movable electric circuit as described in claim 11, wherein
    said Al-based conductive element contains Nd at 0.5–5.0% in atomic concentration.

14. A movable electric circuit as described in claim 11, wherein said movable electric circuit is a vibrating gyroscope.

15. A movable electric circuit as described in claim 14, wherein said Al-based conductive element is used for a wiring pattern of the vibrating gyroscope.

* * * * *